3,461,445
AUTOMATIC SEQUENCING OF DATA FROM
          REMOTE UNITS
William H. Luehrmann, Dallas, and William H. Parker,
  Richardson, Tex., assignors, by mesne assignments, to
  Teledyne Exploration Company, Houston, Tex.
         Filed May 9, 1966, Ser. No. 548,704
      Int. Cl. H04q 3/00; G08b 29/00; H04m 11/04
U.S. Cl. 340—147                              10 Claims This invention relates to new and improved automatic sequencing circuitry for connecting a central data-tally means sequentially to a multiplicity of remotely located data acquiring units all coupled together by a multi-conductor cable, and more particularly relates to a system which employs hard-contact switching at the various units which are interconnected by the cable.

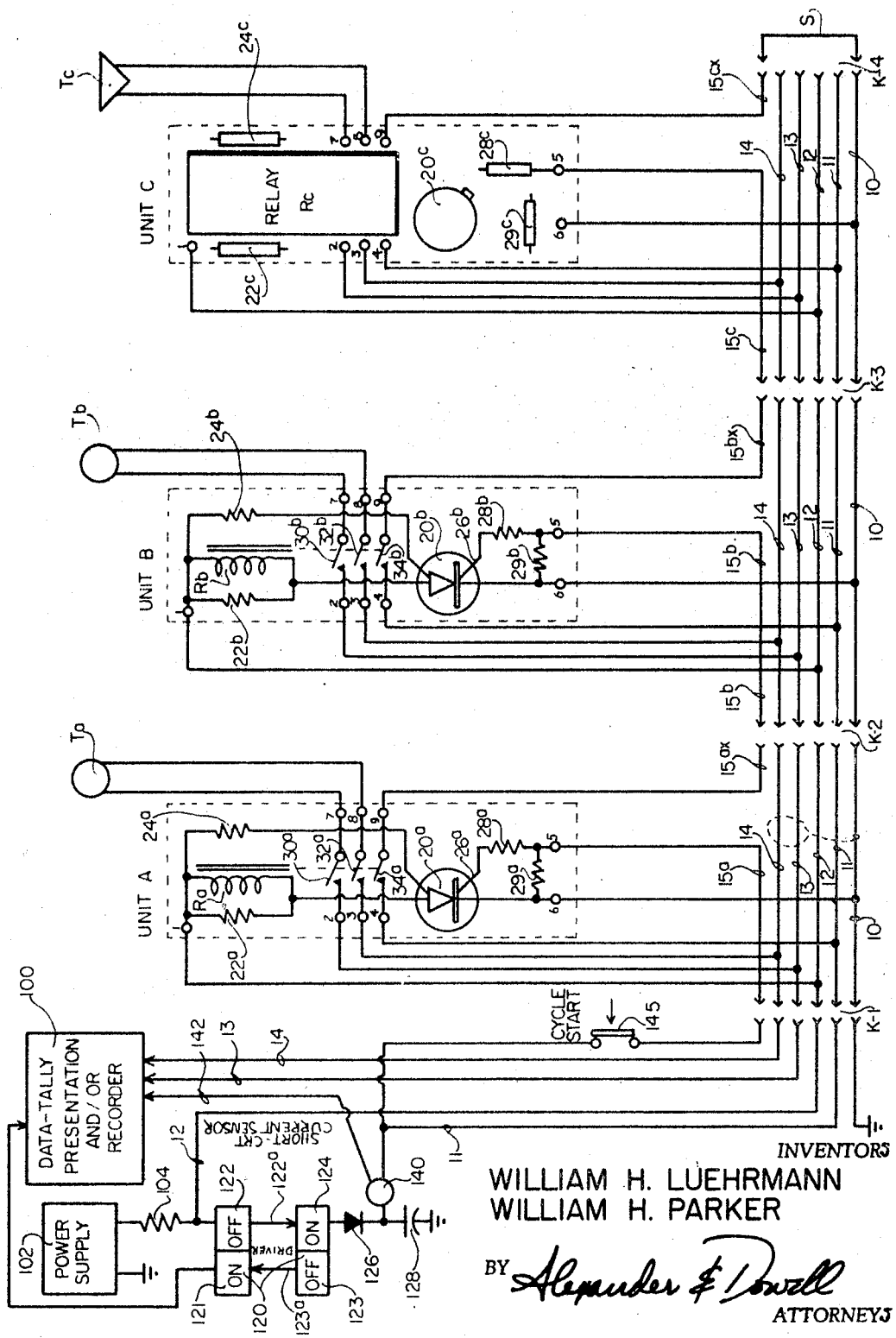

It is a principal object of this invention to provide a system in which the automatic sequencing is accomplished in response to a series of pulses delivered to the cable, and wherein the difference in response time between mechanical relays and electronic valves located at each remote unit is relied upon to commutate the sequential stepping by which the remote sensing units are coupled to the data-tally means through the cable.

It is another major object of this invention to provide a hard-contact sequencing system especially well adapted for use with a large number of remote units mutually interconnected by a cable of great length, the cable bandwidth requirements of the system being relatively low and the system being operative over a wide range of line impedances. For example, many miles of common wire can be used wherein the bandwidth is only about 3000 c.p.s. and the line impedance lies within a range of 10–1000 ohms.

There are other prior art systems using ring-counter types of sequencing, for example as shown in Patent 3,045,210 which uses a common transmission channel to interrogate plural slave units, or such less complex systems which use separate wiring extending to each remote unit as shown in Patents 2,835,884; 3,069,656; 3,117,303; and 3,180,148. The present system has the advantage of using the same wiring to sequentially acquire data from all of the remote units thus simplifying the interconnecting cable. Additionally, the present system employs relatively simple and inexpensive circuitry.

Another object of the invention is to provide a system including simple remote sensing units which can be easily potted within cable connector moldings, and in which system a six-wire cable will suffice to interconnect any reasonable number of remote units.

A further object of this invention is to provide a non-complex system in which there is a very simple cyclic driver means coupled to the cable and employing only two one-shot multivibrators connected in cascade, which driver is adequate to commutate any number of remote units to which it supplies trigger pulses, the relay in each unit providing a mechanical-response delay of sufficient duration to momentarily connect the next succeeding sensing unit to the trigger line to receive the next succeeding trigger output from the driver.

It is an advantage of this system that failure to commutate properly results in cessation of the stepping sequence, rather than improper and/or misleading data acquisition. As each relay in a unit operates, there exists an interval of only a few milliseconds during which the next succeeding sensing unit can be triggered. A failure to commutate during this brief reception interval will result in interruption of the sequence at the faulty sensing unit and in effective resetting of the whole cycle to an initial inoperative condition.

In the various sensing units of the presently illustrated system mechanical relays are employed whose closing and/or opening time is about 2 milliseconds, and each of these relays is energized through an SCR (silicon controlled rectifier) or a more sophisticated related device known as an SCS (silicon controlled switch) to which a triggering pulse is supplied by the common driver through the next preceding sensing unit relay. The SCR or SCS has a well known avalanche characteristic which can be extinguished by breaking the flow of current therethrough. An extremely brief pulse, for instance 50 to 100 microseconds (as compared with the 2 milliseconds relay operating time) breaks down the SCR or SCS, which then remains conductive for an interval sufficient to close the relay. Shortly after the relay is closed, the power to the SCR or SCS is momentarily interrupted by the driver to extinguish the current therethrough, and therefore through the relay. The relay then remains closed for a brief interval mainly because of inertia, and in this closed position connects the trigger output to the next succeeding sensing unit's trigger electrode. This next trigger pulse from the driver unit is timed to pass through the closed but de-energized relay to trigger the next succeeding unit so as to pass current through its relay causing it then to close. By this time the preceding relay has dropped open. Shortly after the succeeding relay is closed, its SCR is extinguished by interruption of the power supply current, and so one. Thus, the cyclic sequence involves triggering a unit to close its relay, and then extinguishing the current holding the relay closed, then triggering the next succeeding unit through the extinguished relay before the latter can drop open.

It is an advantage of this invention that relatively lengthy pulse durations are used, thereby making it possible to ignore relatively large capacities in the cables interconnecting units.

It is another object of the present invention to provide means for indicating correct operation and completion of the stepping sequence.

Still another object of the invention is to provide data-sensing wires within the cable wherein the same wires are sequentially connected to transducers at each sensing unit to couple the output from these transducers, one unit at a time, to a data-tally means which may include presentation and/or recorder means coupled continuously to the cable. This data means can be of a type which tallies the transducer's outputs; or perhaps sets off an alarm if any of the outputs are outside of predetermined tolerance; or it may be of a recording type which sequentially records the output of each transducer. If desired, the data tally means may be synchronously coupled with the pulse driver so as to record the output of each transducer on separately identifiable media, and may additionally be connected to the cyclic driver system to record a marker identifying the end of each stepping cycle.

Other objects and advantages of the present invention will become apparent during the following discussion of the drawing, wherein:

The drawing is a schematic representation of a multiple-unit system in which only three of the units are actually illustrated, and in which the cable is terminated by short-circuiting means to provide a unique signal indicating completion of each stepping sequence.

Referring now to the drawing, a six-conductor cable is illustrated across the bottom of the schematic diagram, and includes four cable connectors K1, K2, K3, and K4. K1 through K3 are substantially similar, but K4 illustrates a special terminating connector having a short-circuit S between the uppermost and the lowermost conductors of the cable for the purpose to be hereinafter explained. Between each adjacent pair of cable connectors is located a sensing unit which is associated with that particular length of cable. A sensing unit may be molded into one of the cable connectors, or into a special housing located intermediate the ends of that length of cable. The present drawing illustrates sensing units labeled unit A, unit B, and unit C, all identical, although units A and B are illustrated schematically while unit C is illustrated in a more pictorial way. Each of the units has nine terminals labeled 1 through 9 respectively, the terminals 1 through 6 and terminal 9 being connected to the conductors of the cable, and terminals 7 and 8 being respectively connected to transducers which are only schematically illustrated, and which are respectively labeled Ta, Tb, and Tc. The precise nature of these transducers need not be discussed since their details form no part of the present invention. They represent, for example, thermistors, pressure transducers, strain gauges, light-sensitive cells, or any one of a number of other well-known sensing devices.

The six conductors of the cable itself have been labeled 10, 11, 12, 13, 14, and 15, with appropriate superscripts. The wires 13 and 14 represent data sensing wires which can be shielded if desired within the cable by braid in a manner well-known per se. The units A, B, and C sequentially connect the transducers Ta, Tb, and Tc one at a time to the sense pair of wires 13 and 14 which lead to the data-tally means 100, designed to decode, present, and/or record the various transducer outputs sequentially appearing on the sense wires 13 and 14.

Each sensing unit includes a relay Ra, Rb, or Rc having a winding which is connected at one end to terminal 1 and at the other end to a silicon controlled rectifier device such as an SCR or an SCS. These devices in the various units are labeled 20a, 20b and 20c respectively, and have their anodes connected to the relay windings. The cathodes of the silicon devices 20 are connected to terminals 6 and thence to the ground wire 10 of the cable. Each of the relays Ra, Rb, and Rc has a transient-quenching resistance 22a, 22b, and 22c connected thereacross to protect the silicon controlled device 20 from reverse spikes. Where the device 20 comprises an SCS, the anode gate terminal thereof can be connected to power terminal 1 through an optional resistor 24a, 24b, or 24c whose value is adjusted in order to control the breakdown sensitivity of the device in order to make it more immune to noise appearing accidentally on the cable. If an SCR is used, the optional circuit including the resistor 24 is eliminated.

Each relay has three switch contact pairs which are closed when the relay windings are energized, and which comprise the contacts 30a and 30b, 32a and 32b, and 34a and 34b, these contacts respectively connecting terminals 2 and 7, 3 and 8, and 4 and 9 when the relay is closed. Terminals 2 and 7 and 3 and 8 connect the transducers T with the sense wires 13 and 14, but terminals 4 and 9 are trigger terminals serving to enable the next succeeding silicon control device 20 to receive the next sequential trigger pulse from the pulse driver 120, which will be more fully described hereinafter.

For the moment returning to a description of the various sensing units A, B and C, the silicon controlled devices have cathode trigger gates 26a and 26b which are connected to the carry lines 15a, 15b, or 15c via the terminals 5 and through current limiting resistors 28a, 28b or 28c. In addition, resistors 29a, 29b, and 29c are connected in shunt across the gate circuit to dissipate any transients or leakage and thereby make the circuit more immune to spurious triggering. The cable connecting the various units has an input end having a cable connector K1 which couples it to the power supply, to the driver and to the data-tally means common to all of the sensing units. The power supply 102 delivers current through a resistance 104 to power supply wire 12 in the cable, and this power is used in succession by the various sensing units A, B and C to close the relays. It will be noted however that the lower end of the resistance 104 is also connected to one of the multivibrators of the driver 120.

The driver 120 includes two one-shot multivibrators, each comprising for example two sections one of which is normally conductive. The upper multivibrator includes a normally non-conductive section 121 and a normally conductive section 122, and the lower multivibrator includes sections 123 and 124. Both multivibrators are of the one-shot variety which is monostable, and therefore tends to return to a normally "off" condition in which the sections 122 and 123 are conductive. When the section 122 is conductive during the stable off time of the upper multivibrator, it short-circuits the junction of the wire 12 and the resistor 104, thereby removing or short-circuiting the power supplied to the power wire 12 of the cable. On the other hand, when the upper multivibrator is triggered to its unstable "on" condition in which the section 121 is conductive, the short-circuit is removed from the wire 12 and the resistor 104, and power is available on the wire 12 of the cable to operate a relay R. This periodic interruption of the power supply wire 12 is used to extinguish the silicon controlled semiconductor devices 20a, 20b, or 20c.

The one-shot 121 and 122 is connected in cascade with the one-shot 123 and 124 so that each triggers the other after inserting a time delay proportional to the time constant controlling its own unstable conductive condition. The time constant of the lower one-shot 123 and 124 is very much shorter than the mechanical response time of the relays R, for example the mechanical response time being of the order of 2 milliseconds and the time constant of the lower one-shot 123 and 124 being in the range of 50 to 100 microseconds. On the other hand, the time constant in the astable condition of the upper one-shot 121 and 122 is somewhat longer than the mechanical response time of the relays R, for example, about 3 or 4 milliseconds. Thus, the upper one-shot when triggered by the lower remains "on" (conductive in section 121) for 4 milliseconds, and as it shuts off it triggers the lower one-shot 123 and 124 "on" (conductive in section 124), but the latter remains on for only 50–100 microseconds. Likewise, when it goes off again it triggers the upper one-shot, and so on. As pointed out above the upper one-shot section 122 when conductive short-circuits the current to the power supply wire 12. On the other hand, when the lower one-shot 124 is conductive, it passes current through the diode 126 to charge the capacitor 128, and supply thereacross a trigger potential to the trigger wire 11 of the cable. This trigger current persists only briefly, and is delayed somewhat in time by the capacitor 128 for the purpose hereinafter explained. The trigger potential is delivered through the short-circuit current sensor 140 which is used to sense the end of the entire stepping sequence after the individual sensing units A, B and C have been energized. The short-circuit current sensor 140 is used to sense the cable termination S after all units have been energized, and to deliver a signal through the wire 142 to the data-tally device 100 to mark successful completion of the sequence. The sequence is commenced by closing the start switch 145 in this particular illustrative embodiment, although the cycle can be made to continually repeat by coupling the wire 15cx to the wire 15a, assuming that the rightmost end of the cable is conveniently accessible to the leftmost beginning end of the cable. In this event the short-circuiting device S at the cable connector K4 would be omitted.

Operation

It is the purpose of the sensing units A, B, and C to sequentially couple transducers Ta, Tb, and Tc to the cable passing across the bottom of the drawing and leading to the data-tally means 100, the cable being furnished with power from the power supply 102; and the sensing units A, B and C being sequentially energized by output pulses from the driver 120 comprising cascade-connected one-shot multivibrators.

The lowermost wire 10 in the cable is the common return lead which can be grounded if desired. The wire 12 in the cable is normally supplied with power by the power supply 102, but this power is short-circuted, and thereby interrupted whenever the driver section 122 is conductive. The wires 13 and 14 are the senses-wires by way of which the units A, B, and C sequentially connect one of the transducers Ta, Tb or Tc to the data-tally means 100. The wire 11 of the cable is the wire to which the drive 120 furnishes trigger pulses at intervals which are synchronized to have a fixed relationship with the interruption of the power to the power supply wire 12 by the driver section 122. The wires 15a through 15cx are the "carry" wires by which each sensing unit A, B or C enables the next succeeding sensing unit to receive the next trigger pulse applied to the wire 11 by the driver unit 120.

In the illustrated embodiment, the system remains at rest with all of the relays Ra, Rb and and Rc open until the cycle start switch 145 is momentarily closed to pass a trigger pulse to the wire 15a and into the cathode gate electrode 26a of the SCS 20a. This pulse arrives at the gate 26a at a moment when uninterrupted power is supplied on wire 12 to terminal 1 of unit A. The SCS 20a is therefore rendered conductive permitting current to flow from the power supply to the relay winding Ra to close the switch contacts 30a, 32a, and 34a. This closure takes about 2 milliseconds, the mechanical operating time of the relay, which then remains closed until power is short-circuited from the wire 12 by the one-shot section 122 as will presently be described. When this short-circuiting occurs, at the end of about 4 milliseconds the SCS 20a is extinguished, thereby breaking the flow of current through the relay winding. Any transient pulses generated in the windings are damped by the resistor 22a. Due to the mechanical operating time of the relay Ra its contacts will remain closed for a fraction of a millisecond after SCS 20a is extinguished, and during this interval another trigger pulse will appear on the wire 11 of the cable, and this pulse will be coupled through the terminal 4, the switch 34a and the terminal 9 into the wires 15ax and 15b, and thence into the gate 26b through the current limiting resistor 28b, thereby breaking down the SCS 20b and rendering its conductive. At this moment, the short-circuit on the power supply wire 12 has been removed, thereby energizing terminal 1 of sensing unit B in order to close relay Rb, and by the time Rb closes, the relay Ra has dropped open due to the aforesaid extinguishing of the SCS 20a, thereby removing transducer Ta from the sense wires 13 and 14 and applying transducer Tb to these same wires. The operating time constants of the driver 120 can be regulated so as to provide either some overlap of two successive transducer outputs at the data-tally device 100, or to provide precise substitution of one for the other, or to provide a time gap therebetween. The latter has the advantage of making it easier to distinguish successive transducer signals at the tally device in systems where the signals are successively recorded on the same recorder medium.

Since the silicon controlled device 20 in each sensing unit can only be triggered through the wire 15a, 15b, or 15c at a time when the preceding relay R or start switch 145 is closed, the units can be energized only in sequence, and only if the relationship of the driver is properly timed with respect to the moment of mechanical opening of the preceding relay once its associated SCS has been extinguished.

Referring now to the driver 120, the upper one-shot 121 and 122 is normally conductive in its "off" section 122, this being its stable condition in which it short-circuits the power supply wire 12. When the one-shot 121 and 122 is triggered to its astable "on" condition, section 121 becomes conductive for 4 milliseconds in the present example, and therefore the power supply wire 12 is energized for 4 milliseconds, long enough to close one of the relays R in any of the units A, B or C which is being triggered. When one-shot 121 and 122 reverts to "off" conductive condition, power is again short circuited from the wire 12, thereby extinguishing whichever SCS 20 is associated with the presently-closed relay. Resumption of conduction by the section 122 sends a pulse on wire 122a to trigger the other one-shot multivibrator 123 and 124. Before being triggered, the latter one-shot was conductive at its "off" section 123. The triggering via the wire 122a renders the lower multivibrator conductive in section 124, but only for the duration of its time constant, 50–100 microseconds, during which time current is delivered through the diode 126 to charge the capacitor 128. The lower-one-shot 123 and 124 thus generates the brief trigger pulse which is applied to the wire 11 in the cable, but this pulse has to be delayed somewhat because it would otherwise arrive at an SCS 20 during a moment when the power supply wire 12 is short circuited by the upper one-shot section 122, this being an ineffective moment for the trigger to arrive. Therefore, the capacitor 128 together with the appropriate current limiting resistor 28a, 28b or 28c provides a time constant which delays the trigger pulse long enough in the cycle to have it arrive at the moment when power has just been resumed at the wire 12. When the lower one-shot returns to stable "off" condition in which the section 123 is conductive, it triggers the upper one-shot through the wire 123a so as to turn off the section 122 for another 4 milliseconds and resume power on the wire 12. It is after the resumption of power on this wire that the trigger pulse generated in section 124 is delivered by the capacitor 128 to break down the appropriate SCS 20.

When the last sensing unit C has had its relay closed, the next trigger pulse from the wire 11 is delivered through contacts 4 and 9 into the wire 15cx, but, unlike the other preceding trigger pulses, this last trigger pulse is short circuited directly to ground through the terminating wire S, thereby drawing a greater-than-normal pulse current through the short-circuit current sensor which then delivers a signal on wire 142 to the data-tally means 100 to signify the successful completion of the sequencing cycle. In a simpler embodiment of the invention, the short circuit current sensor 140 could comprise a simple lamp that would light briefly at the end of each successful cycle. Alternatively, the current sensor 140 could be a transistor, a sensitive relay device, or some other such means.

Appropriate values for the sensing units of the presently illustrated embodiment are as follows:

| | |
|---|---|
| Silicon-Controlled Switch | 3N84 |
| Relay | G.E. 3SBD–5–3–0–1–E–1 |
| Resistors 22 ohms | 1000 |
| Resistors 24 do | 100,000 |
| Resistors 28 do | 470 |
| Resistors 29 do | 270 |

We claim:
1. A sequencing system for sequentially coupling a central data tally means step-by-step with multiple data acquiring units through common wires of an interconnecting cable, the system comprising:
 (a) a source of power connected to said cable;
 (b) a mechanical relay in each unit having trigger-carrying contacts, having data-conducting contacts connected with said wires, and having a winding for closing all said contacts;
 (c) controlled-rectifier means in each unit and coupling the winding therein to the power source through said cable and each controlled rectifier means having a trigger electrode operative to cause it to avalanche;
 (d) cyclic driver means coupled to the power source and cable and operative to control the power to all controlled rectifier means to periodically interrupt the current therethrough and thereby extinguish said avalanche, and operative subsequent to each interruption to deliver a trigger output coupled through the cable to one side of each of said trigger-carrying contacts; and (e) conductor means in said cable coupling the other side of each of said trigger-carrying contacts to the trigger electrode in the next succeeding unit along the cable.

2. In a system as set forth in claim 1, said mechanical relays each having an interval of delay between initial interruption of said power and opening of said contacts, and said driver means being timed to deliver its trigger output within said delay interval.

3. In a system as set forth in claim 1, said cable including a carry wire comprising said conductor means and extending from the trigger-carrying contacts in one unit to the electrode in the next unit; a trigger-current limiting resistance connected between the carry wire and each electrode, and the carry wire which extends to the trigger electrode in the first unit being coupled through cycle-start switching means to the trigger output of the driver.

4. In a system as set forth in claim 3, said cable including a ground wire, and the carry wire which extends from the trigger contacts in the last unit along the cable being short circuited to said ground wire, and measuring means responsive to trigger current when the last relay closes and short-circuits it to ground to indicate successful completion of the step-by-step sequence.

5. In a system as set forth in claim 4, first means coupled from said driver to said data-tally means; and second means coupled from said measuring means to said data-tally means, said first and second means respectively entering into the tally means indications of the step-by-step succession of the units and of the successful completion of the sequence.

6. A sequencing system for sequentially connecting data-sensing means at plural remote sensing units spaced along a common cable to a common data-tally means coupled to the cable, comprising:

(a) mechanical relay means in each unit and having multiple contacts connected to the cable and closable by a relay winding, some of the contacts being connected to the data-sensing means associated with each unit, and the relay means having a certain mechanical response time;

(b) controlled rectifier means in each unit coupled between the winding and a power line within the cable and having a trigger electrode operative to avalanche the rectifier means;

(c) cyclic driver means coupled to the cable and operative to alternately establish and interrupt flow of current to the power line, the interruption occupying an interval substantially less than said response time, and the driver means further including means for delivering a trigger pulse to a trigger line in the cable when the power interruption ends; and (d) circuit means connected from the trigger line through carry contacts of the relay means in each unit and to the trigger electrode of the next succeeding unit along the cable.

7. In a system as set forth in claim 6, said cable including power lines, data-sense conducting lines, and a trigger line and all of these lines being common to all units.

8. In a system as set forth in claim 6, said cable including a carry wire comprising said circuit means and extending from the trigger contacts of one unit to the electrode of the next unit, the carry wire which extends to the trigger electrode in the first unit being coupled through cycle-start switching means to a source of triggering potential at the driver.

9. In a system as set forth in claim 8, the carry wire which extends from the trigger contacts in the last unit along the cable being short circuited to one of the power lines, and the system including means coupled with the trigger line to measure short-circuit current when the last relay is closed to indicate successful completion of the sequencing cycle.

10. In a system as set forth in claim 9, means coupled from said measuring means to said data-tally means to enter an indication of completion of the cycle therein.

References Cited

UNITED STATES PATENTS

| | | | |
|---|---|---|---|
| 3,399,395 | 8/1968 | Heymann | 340—147 |
| 3,403,379 | 9/1968 | Perry | 340—147 |

JOHN W. CALDWELL, Primary Examiner

HAROLD I. PITTS, Assistant Examiner

U.S. Cl. X.R.

73—341; 324—113; 340—151, 310, 408